United States Patent [19]

Craddock

[11] Patent Number: 4,790,101
[45] Date of Patent: Dec. 13, 1988

[54] SEMI-WEEDLESS LURE

[76] Inventor: Larry E. Craddock, 10926 Jollyville, Apt. 416, Austin, Tex. 78759

[21] Appl. No.: 112,696

[22] Filed: Oct. 26, 1987

[51] Int. Cl.⁴ ............................................. A01K 85/00
[52] U.S. Cl. .................................. 43/42.37; 43/42.24; 43/42.28
[58] Field of Search ................. 43/42.03, 42.22, 42.24, 43/42.25, 42.37, 42.39, 42.28, 42.47

[56] References Cited

U.S. PATENT DOCUMENTS

| | | | |
|---|---|---|---|
| 2,045,703 | 6/1936 | DuBois | 43/42.37 |
| 2,231,507 | 2/1941 | Richards | 43/42.37 |
| 3,121,291 | 2/1964 | Iffland, Jr. et al. | 43/42.37 |

FOREIGN PATENT DOCUMENTS

| | | | |
|---|---|---|---|
| 0004551 | of 1894 | United Kingdom | 43/42.25 |
| 0007912 | 4/1906 | United Kingdom | 43/42.25 |

*Primary Examiner*—Nicholas P. Godici
*Assistant Examiner*—Richard K. Seidel
*Attorney, Agent, or Firm*—Joseph F. Long

[57] ABSTRACT

A semi-weedless fish lure that produces a natural swimming motion with either a hair-like tail or natural bait around the hook; the proper combination of weights, hook length, size of a circular clear plastic deflector plate and hook eye location is necessary.

8 Claims, 1 Drawing Sheet

SEMI-WEEDLESS LURE

BACKGROUND OF THE INVENTION

Fishermen continue to search for a lure that will not catch on weeds but will attract fish causing them to strike the lure.

This invention covers a particular type lure wherein in one embodiment a trailing hair-like material partially conceals the hook and weights and a plastic deflector plate causes a natural swimming action. The plastic deflector plate is just behind a weight that is around the shank of the hook. The hook eye is at right angles to the shank and in the same plane as a single hook.

In a second embodiment the hair-like tail is left off and a natural bait such as a worm or grub or cut bait is used. The proper weight, tying collar, deflector plate and hook will also give a natural swimming action when the natural bait is used.

In a third embodiment the size of the parts was the same as in the second and first embodiments and a plastic worm was used over the hook also giving a natural swimming action.

In other embodiments a treble hook was substituted for a single hook and worked essentially as well.

In all cases it was found necessary to have the hook shank exactly centered in the round plastic deflector plate.

The unique feature of this invention is a natural swimming action imparted to the lure by use of a solid lead weight just behind the hook eye, a hook eye at right angles to the hook shank, and a round plastic deflection plate mounted solidly to the hook shank just behind the weight. The size of the weight, the size and length of the tying collar, the length of the hook shaft, the right angle hook eye, the size of the deflector plate and the hair-like tail or natural bait interact to cause the hook to ride smoothly through the water with a natural swimming motion that may be caused by the vortex formed in the water behind the deflector plate.

In one embodiment a single hook with a 2" shank, a lead weight of 3/16 oz. with ⅜" long lead tying collar, a round plastic disc or deflector plate 1/16" in thickness and ¾" diameter and a 4" long hair-like tail were properly sized to secure the natural swimming action. The round plastic disc or deflector plate was fastened solidly to the shank of the hook. The hair-like tail may be omitted and natural bait such as a worm or grub substituted and the lure as described will still have a natural swimming action.

The hook eye in the same plane as the hook and at right angles to the hook shank contributed to smoother action of the lure.

There are numerous patents in this field and we have considered those with following Serial Numbers in Class 43, subclasses 42.03, 42.28, and 42.47

Ser. Nos. 696,433
1,154,168
1,297,354
1,450,777
1,495,832
1,522,450
1,601,267
1,777,594
1,782,204
1,926,459
2,429,568
3,180,050
3,410,020
3,729,850

All were considered and the closest to the present invention were U.S. Pat. Nos. 1,601,267, 1,495,832, and 1,926,459. The present invention differs in a significant manner from any patents considered. The proper combination and sizing of weight, length and weight of the tying collar, shaft length of hook, size of deflector plate and natural or artificial bait to give the natural swimming action is unique.

BRIEF STATEMENT OF THE INVENTION

The invention comprises a round lead weight connected to a lead tying collar around the shank of a hook with the hook eye exiting the round lead weight at right angles to the hook shaft; a clear round plastic deflector plate glued at the plastic plate center point around the tying collar and against the round weight; and, in one embodiment, a hair-like tail fastened around the tying collar. In other embodiments the hook is left bare and natural bait or plastic bait such as a plastic worm is used.

With proper sizing all embodiments exhibit the desired swimming action as the lure is pulled through the water. The swimming action is probably caused by the vortex or water flow disturbance caused by pulling the flat deflector plate through the water.

Minor mechanical changes could be made without destroying the function of the lure, therefore we wish only to be limited to the spirit and purpose as outlined in these claims and specifications rather, than to exact details of the invention as outlined.

DETAILED DESCRIPTION OF THE DRAWING

Figure 1:
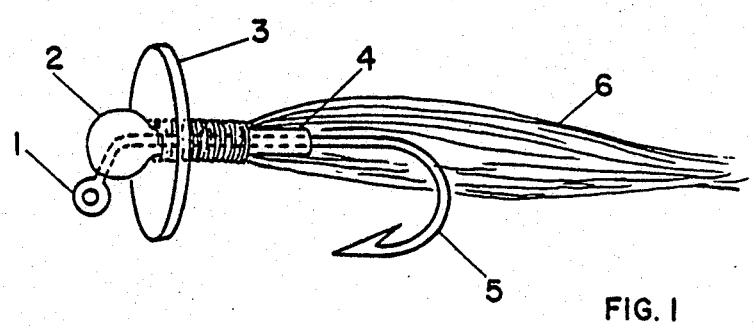
FIG. 1 shows on embodiment of the invention showing location of a weight on a single hook, tying collar, deflector plate, and hair-like tail.

A first embodiment of a semi-weedless lure is shown in FIG. 1 wherein a hook eye 1 is at right angles to the longer part of the shank of hook 5 with a round lead weight 2 integrally formed with the lead tying collar 4 around the shank of hook 5. A clear plastic deflector plate is centered around the tying collar 4 and is glued to the tying collar 4 and weight 2 with epoxy resin. In this embodiment a hair-like material 6 such as "Craftfur" or natural hair is tied around the tying collar 4.

Figure 2:
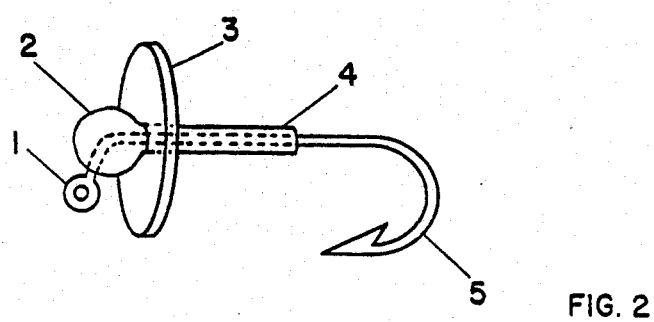
FIG. 2 shows a second embodiment wherein natural bait may be placed over the hook.

In FIG. 2 we show a second embodiment exactly similar to FIG. 1 but without the hair-like tail 6. In this embodiment natural bait such as a grub or night crawler is used on the hook.

Figure 3:
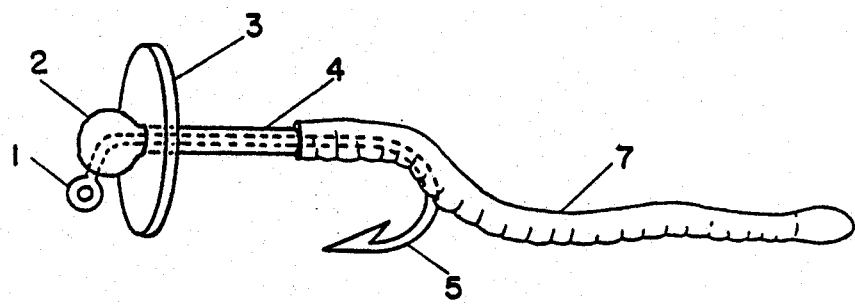
FIG. 3 shows a third embodiment of the invention using a plastic worm over the hook.

In FIG. 3 we have shown a third embodiment similar to FIG. 2 with the addition of a plastic worm 7 over the hook.

Figure 4:
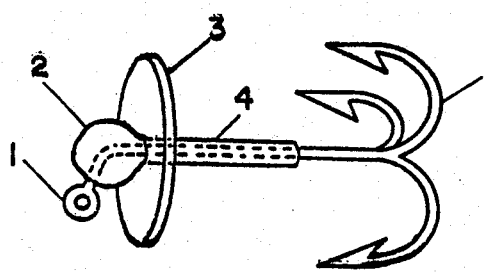
FIG. 4 shows a fourth embodiment of the invention using a treble hook.

In FIG. 4 we've shown a fourth embodiment similar to the second embodiment in FIG. 2, but the single hook 5, FIG. 2 is replaced with a treble hook 8.

What is claimed is:
1. A semi-weedless lure comprising
   a. a hook,
   b. a hook eye at a right angle to a shank of said hook, c. a round metallic weight around said hook eye,
d. an elongated metallic tying collar around said shank of said hook and behind said round metallic weight,
e. a round clear flat plastic deflector plate rigidly fastened around said tying collar and adjacent to said round metallic weight.

2. A semi-weedless lure as in claim 1 where a flexible hair-like material is fastened around said elongated metallic tying collar of said shank of said hook.

3. A semi-weedless fishing lure as in claim 1 where natural bait is used on said hook.

4. A semi-weedless lure as in claim 1 where artificial bait is used on said hook.

5. A semi-weedless lure comprising:
a. a hook,
b. a metallic tying collar on a shank of said hook,
c. means to cause a swimming motion comprising a flat round deflector plate rigidly attached around said tying collar and adjacent to a round weight formed over a bend in said shank leading to a hook eye.

6. A semi-weedless lure as in claim 5 where bait on said hook is a hair-like material fastened to said tying collar.

7. A semi-weedless lure as in claim 5 where bait on said hook is natural material.

8. A semi-weedless lure as in claim 5 where bait on said hook is artificial bait.

* * * * *